Feb. 10, 1970    A. E. PIRMAN    3,494,627
JAW CHUCK
Filed Nov. 15, 1967
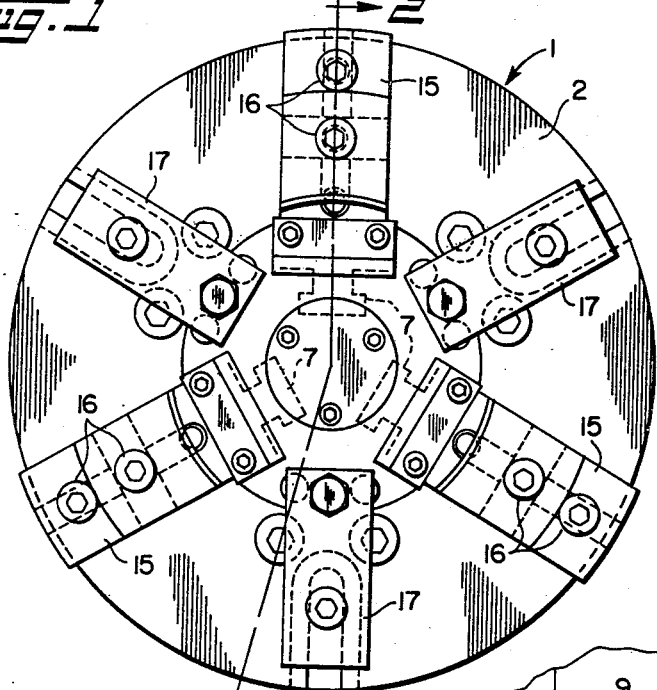
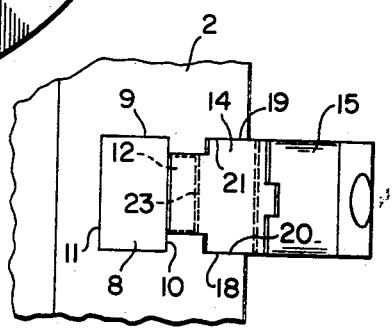
Fig. 4
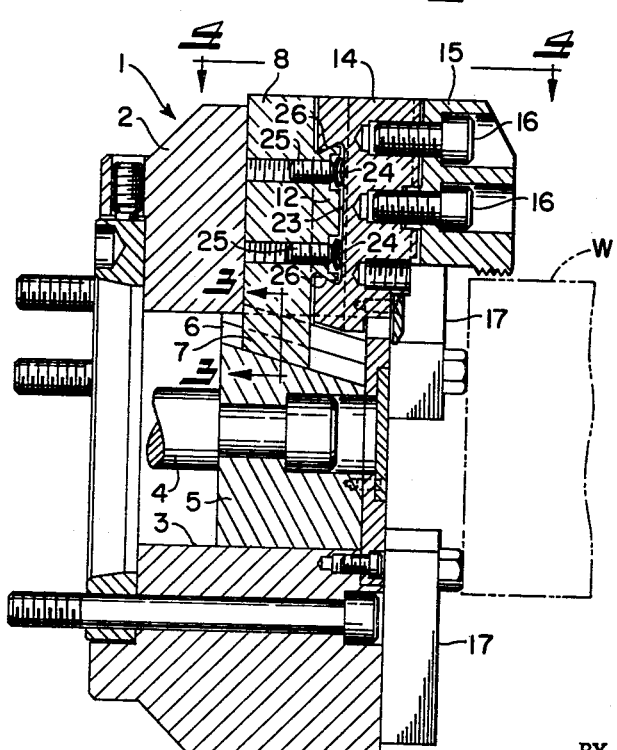
Fig. 2
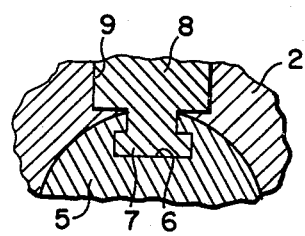
Fig. 3
INVENTOR
ANTON E. PIRMAN
BY
Oberlin, Maky, Donnelly & Renner
ATTORNEYS

United States Patent Office 3,494,627
Patented Feb. 10, 1970

3,494,627
JAW CHUCK
Anton E. Pirman, 1005 Oakview Drive,
Highland Heights, Ohio 44113
Filed Nov. 15, 1967, Ser. No. 683,307
Int. Cl. B23b 31/16
U.S. Cl. 279—121                                    7 Claims

ABSTRACT OF THE DISCLOSURE

Jaw chuck characterized in that when the jaws are actuated radially to grip the interior or exterior of a workpiece they are caused to draw or pull back the workpiece and maintain the latter firmly against a locating stop.

BACKGROUND OF THE INVENTION

It is known in jaw chucks to provide a plurality of radially movable jaws which are guided for radial movement in T slots or dovetail grooves in the chuck body. Although the jaws are thus guided in the chuck body for radial movement, there may be a slight cocking of the jaws when engaged with a workpiece which effects movement of the workpiece in a direction away from the locating stop. In any case, even with a close sliding fit, the workpiece is not drawn tight against the locating stop.

SUMMARY OF THE INVENTION

Contrary to the foregoing, in the present jaw chuck there is provided a novel connection between the respective jaws and jaw actuators which is effective to draw in or pull back, the gripped workpiece firmly against the locating stop.

It is accordingly, a principal object of this invention to provide a jaw chuck which is effective to draw in or pull back the workpiece against a locating stop as the jaws move radially outwardly or inwardly into gripping engagement with the workpiece.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawing setting forth in detail a certain illustrative embodiment of the invention, this being indicative, however, of but one of the various ways in which the principle of the invention may be employed.

BRIEF DESCRIPTION OF THE DRAWING

FIG. 1 is a front elevation view of a jaw chuck embodying the present invention;

FIG. 2 is a cross-section view taken substantially along the line 2—2, FIG. 1;

FIG. 3 is a cross-section view taken substantially along the line 3—3, FIG. 2; and FIG. 4 is a fragmentary top plan view taken substantially along the line 4—4, FIG. 2.

DISCUSSION OF THE INVENTION

The jaw chuck 1 herein comprises a chuck body 2 fashioned at its rear end for mounting on a machine tool spindle, not shown.

Reciprocable in the central bore 3 of the chuck body 2 as by the drawbar 4, is a wedge block or head 5 having inclined axially extending T slots 6 in which are engaged the correspondingly sloped T portions 7 of jaw actuators 8 which are guided for radial outward and inward movement in the respective slideways 9 formed in the chuck body 2. It can be seen from FIG. 2 that when the drawbar 4 is pulled toward the left the jaw actuators 8 are moved radially inwardly and that when the drawbar 4 is pushed toward the right the jaw actuators 8 are moved radially outwardly. Preferably, the radial slideways or slots 9 have the surfaces 10 and 11 thereof in close sliding contact with the front and rear surfaces of the respective jaw actuators 8.

Insofar as the present invention is concerned, it is a matter of indifference as to what type of mechanism is utilized for effecting radial movement of the jaw actuators 8, i.e., said actuators 8 may be gear-operated or lever operated, for example, as is well known in the art.

Each jaw actuator 8 has a transversely disposed dovetail connection 12 with a jaw assembly which herein is shown as comprising a jaw base 14 to which the top jaw 15 is secured as by the screws 16, the jaw 15 being shown mounted for gripping the enterior of a workpiece W. However, each jaw 15 is reversible to grip the interior of a workpiece.

Adjustably mounted on the chuck body 2 are workpiece stops 17 adapted to be engaged as by the end of a workpiece W as shown in FIG. 2.

The opposite sides 18 and 19 of each jaw base 14 have a close sliding fit with the surfaces 20 and 21 of the front part of the slideway 9 of the chuck body 2.

Referring in more detail to the dovetail connection 12 between each jaw actuator 8 and associated jaw base 14, there is a slight clearance 23 between the bottom of the dovetail groove and the end of the dovetail tongue and also between the adjacent surfaces of the jaw actuator 8 and jaw base 14, and spring washers 24 are preloaded by screws 25 to yieldably maintain the beveled dovetail surfaces 26 which also extend transverse to the radial axes of the jaw actuators in engagement with each other.

Assuming that the drawbar 4 is pulled to the left while a workpiece W has its end engaged with the stops 17, the movement of the block 5 will cause the jaw actuators 8 to move radially inwardly and when the jaws 15 engage the workpiece W, the radially inner beveled faces 26 of the dovetail connections 12 will permit relative sliding movement therebetween to pull back or draw in the jaws 15 toward the jaw actuators 8 a distance up to the amount of the aforesaid clearance 23. Likewise, the clamping forces exerted by the jaws 15 against the workpiece W will tend to cock the jaws 15 to compress the radially outer spring washers 24 while the radially inner spring washers 24 are being compressed due to the interaction of the inner beveled dovetail faces 26. In this way, the jaws 15 are maintained in parallelism with respect to the jaw actuators 8, while pulling back the workpiece W tightly against the stops 17.

When the jaws 15 are turned around to grip the interior of a workpiece, the radially outer beveled dovetail faces 26 will thus be effective to draw in the workpiece tightly against the stops 17 while the radially inner spring washers 24 yield to maintain parallelism between the jaws 15 and the actuators 8.

Other modes of applying the principle of the invention may be employed, change being made as regards the details described, provided the features stated in any of the following claims, or the equivalent of such, be employed.

I therefore particularly point out and distinctly claim as my invention:

1. In a jaw chuck, the combination of a chuck body having radial slots therein and a stop adapted to be engaged by a workpiece; jaw actuators radially movably supported in said slots; jaws mounted on the respective actuators for radial movement therewith; means for radially moving said actuators to grip and release a workpiece by said jaws positioned against said stop; and means providing transverse dovetail tongue and groove connections between said jaws and actuators having transversely extending radially spaced beveled faces on said actuators and jaws, with axial clearance between the ends of the dovetail tongues and the bottoms of the dovetail grooves and between the adjacent surfaces of said jaws and actuators; said beveled faces being movable relative to each other upon engagement of said jaws with such workpiece to draw said jaws toward said actuators and thus urge the workpiece axially against said stop.

2. The chuck of claim 1 wherein said slots have axially rear and front faces in close sliding engagement with said actuators and have side faces in close sliding engagement with opposite sides of said jaws.

3. The chuck of claim 1 further comprising spring means between said jaws and actuators yieldably resisting axial inward movement of said jaws toward said actuators to take up such clearance.

4. The chuck of claim 3 wherein said means for moving said actuators comprises a draw bar having inclined T-slot connections with the radially inner ends of the perspective actuators.

5. The chuck of claim 3 further comprising screw means for preloading said spring means.

6. The chuck of claim 3 wherein there are radially spaced spring means between each of said jaws and actuators adjacent said radially spaced beveled faces for yieldably resisting axial inward movement of said jaws toward said actuators as aforesaid, the radially inner spring means being compressed by the interaction of the radially inner beveled faces of said dovetail connections upon radial inward movement of said jaws into engagement with a workpiece and consequent drawing of the jaws toward the respective actuators a distance up to the amount of the clearance between said tongues and grooves, and the radially outer spring means being compressed by the cocking of the jaws during clamping of the workpiece, whereby said jaws are maintained in parallelism with respect to said actuators.

7. The chuck of claim 3 wherein there are radially spaced spring means between each of said jaws and actuators adjacent said radially spaced beveled faces for yieldably resisting axial inward movement of said jaws towards said actuators as aforesaid, the radially outer spring means being compressed by the interaction of the radially outer beveled faces of said dovetail connections upon radial outward movement of said jaws into engagement with the workpiece and consequent drawing of said jaws toward the respective actuators a distance up to the amount of the clearance between said tongues and groves, and the radially inner spring means being compressed by the cocking of the jaws during clamping of the workpiece, whereby the jaws are maintained in parallelism with respect to said actuators.

References Cited

UNITED STATES PATENTS 2,158,490    5/1939    Webster       279—123
3,266,812    8/1966    Mott et al.    279—121

OTHELL M. SIMPSON, Primary Examiner

D. D. EVENSON, Assistant Examiner

U.S. Cl. X.R.

279—123